United States Patent
Borkar et al.

(10) Patent No.: US 11,056,112 B2
(45) Date of Patent: Jul. 6, 2021

(54) VOICE-BASED OPERATIONS

(71) Applicant: Citrix Systems, Inc., Fort Lauderdale, FL (US)

(72) Inventors: Vipin Borkar, Bengaluru (IN); Santosh Sampath, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 188 days.

(21) Appl. No.: 16/374,311

(22) Filed: Apr. 3, 2019

(65) Prior Publication Data
US 2020/0320991 A1    Oct. 8, 2020

(51) Int. Cl.
*G10L 15/00*    (2013.01)
*G10L 15/22*    (2006.01)
*G06F 3/16*    (2006.01)
*G10L 15/30*    (2013.01)
*G10L 13/00*    (2006.01)

(52) U.S. Cl.
CPC .............. *G10L 15/22* (2013.01); *G06F 3/167* (2013.01); *G10L 13/00* (2013.01); *G10L 15/30* (2013.01); *G10L 2015/223* (2013.01)

(58) Field of Classification Search
CPC .............. G10L 2015/221; G10L 15/22; G10L 2015/223; G10L 2015/225; G10L 2015/226; G10L 2015/228; G10L 15/26; G10L 15/30; G10L 17/22
See application file for complete search history.

(56) References Cited

U.S. PATENT DOCUMENTS

| | | | | |
|---|---|---|---|---|
| 7,624,192 B2 * | 11/2009 | Meyers | ................... | H04L 67/36 380/270 |
| 8,260,617 B2 * | 9/2012 | Dhanakshirur | ......... | G10L 15/22 704/270 |
| 8,699,674 B2 * | 4/2014 | Bouzid | ..................... | G06F 8/38 379/88.01 |

(Continued)

OTHER PUBLICATIONS

M. Sarkar, M. Z. Haider, D. Chowdhury and G. Rabbi, "An Android based human computer interactive system with motion recognition and voice command activation," 2016 5th International Conference on Informatics, Electronics and Vision (ICIEV), Dhaka, 2016, pp. 170-175, doi: 10.1109/ICIEV.2016.7759990. (Year: 2016).*

(Continued)

*Primary Examiner* — Edgar X Guerra-Erazo
(74) *Attorney, Agent, or Firm* — Foley & Lardner LLP

(57) ABSTRACT

Described embodiments provide systems and methods for capture and translation of voice commands into user interface commands and gestures. A transducer of a device, such as a microphone, may receive an audible or spoken command from a user and may translate the input audio into text via a speech-to-text engine, either as part of the operating system of the device or via a separate agent (which may be executed by the device or a remote server). The text may be interpreted via a natural language parser (either on the device or the remote server) to identify a command, such as scrolling, panning, zooming, or other such gestures. A context may be retrieved, such as coordinates of a cursor or other interface element within a hosted application or SaaS application, and the command may be applied based on the coordinates of the cursor.

15 Claims, 9 Drawing Sheets

(56) References Cited

U.S. PATENT DOCUMENTS

| | | | |
|---|---|---|---|
| 2003/0040341 A1* | 2/2003 | Casais | H04M 1/72445 455/566 |
| 2005/0021336 A1* | 1/2005 | Katsuranis | G06F 3/0481 704/246 |
| 2006/0235699 A1* | 10/2006 | Dhanakshirur | G10L 15/22 704/275 |
| 2009/0292989 A1* | 11/2009 | Matthews | G06F 3/04883 715/702 |
| 2010/0079498 A1* | 4/2010 | Zaman | G06F 3/04883 345/661 |
| 2011/0001699 A1* | 1/2011 | Jacobsen | G06F 3/017 345/157 |
| 2012/0293440 A1* | 11/2012 | Hotelling | G06F 3/04883 345/173 |
| 2013/0132856 A1* | 5/2013 | Binyamin | G06F 3/017 715/740 |
| 2013/0272511 A1* | 10/2013 | Bouzid | G06F 8/38 379/88.01 |
| 2014/0247927 A1* | 9/2014 | Bouzid | H04M 3/493 379/88.01 |
| 2015/0346855 A1* | 12/2015 | Momchilov | G09G 5/003 345/173 |

OTHER PUBLICATIONS

A. Lorenz, M. Jentsch, C. Concolato and E. Rukzio, "A formative analysis of mobile devices and gestures to control a multimedia application from the distance," Melecon 2010—2010 15th IEEE Mediterranean Electrotechnical Conference, Valletta, 2010, pp. 796-801, doi: 10.1109/MELCON.2010.5475964. (Year: 2010).*

* cited by examiner

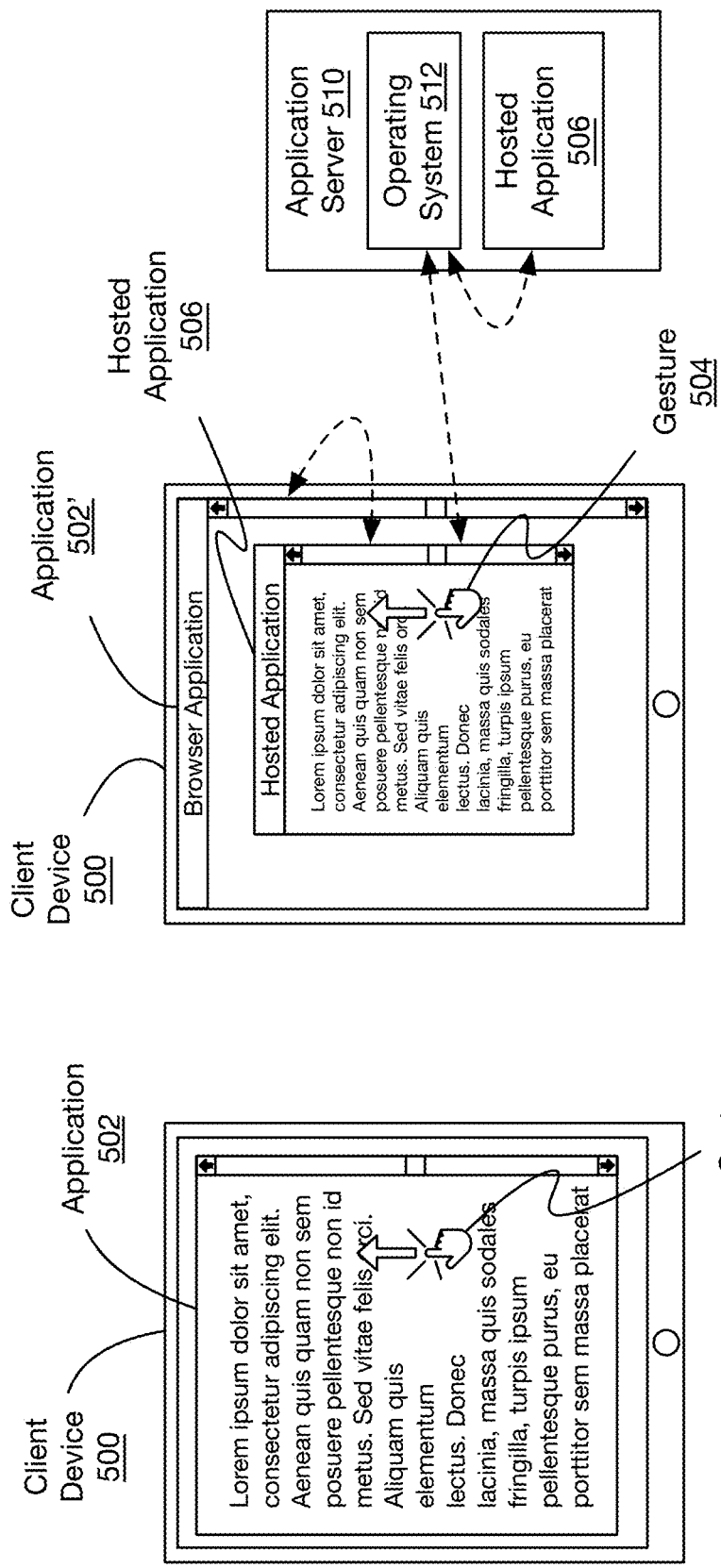

VOICE-BASED OPERATIONS

FIELD OF THE DISCLOSURE

The present application generally relates to user interface control, including but not limited to systems and methods for voice-based control of user interfaces for hosted applications or Software-as-a-Service applications.

BACKGROUND

In many applications, users may interact with a user interface via gestures performed with a mouse, touchpad, or other input device, such as scrolling, panning, zooming (e.g. via a pinch operation or mouse wheel), or other such operations. This may allow a user to scroll through text or images, view subsequent or prior pages, etc.

However, in many instances, users may not wish to use manual gestures to perform these commands. Instead, voice commands may be used in some implementations for simple operations, which may be useful in instances where a user interface is too small (e.g. on a mobile device) or where the user's hands may be unavailable (e.g. driving, in hazardous conditions such as labs or shop floors, etc.).

Many implementations of voice commands utilize native operating system agents of the computing device that perform speech-to-text translations. However, these agents are frequently unable to perform advanced gesture-based commands, and may be limited to opening or closing windows. Furthermore, because of the logical separation between the operating system and hosted applications or Software-as-a-Service (SaaS) applications that may be provided via a remote operating system and/or presented as an application within another application (e.g. browser or remote desktop application), the native operating system agent may be unable to provide commands to the remote application.

SUMMARY

This Summary is provided to introduce a selection of concepts in a simplified form that are further described below in the Detailed Description. This Summary is not intended to identify key features or essential features, nor is it intended to limit the scope of the claims included herewith.

The systems and methods discussed herein allow for capture and translation of voice commands into user interface commands and gestures, allowing more complex interaction than via native operating system speech-to-text engines. In particular, the systems and methods discussed herein allow for use of speech commands as user interface commands within hosted or SaaS applications. A transducer of a device, such as a microphone, may receive an audible or spoken command from a user and may translate the input audio into text via a speech-to-text engine, either as part of the operating system of the device or via a separate agent (which may be executed by the device or a remote server). The text may be interpreted via a natural language parser (either on the device or the remote server) to identify a command, such as scrolling, panning, zooming, or other such gestures. A context may be retrieved, such as coordinates of a cursor or other interface element within a hosted application or SaaS application, and the command may be applied based on the coordinates of the cursor (e.g. as a motion vector for a touch gesture starting from the coordinates). The audible command may include relative parameters, such as a direction or an amount, which may be similarly parsed and applied in combination with the gesture command.

In one aspect, the present application is directed to a method for voice-assisted control of hosted applications. The method includes accessing, by a computing device via a network, an application provided by an application server on behalf of a user of the computing device. The method also includes receiving, by the computing device via a local input device, an audible command. The method also includes translating, by the computing device, the audible command into a gesture-based command. The method also includes providing, by the computing device via the network, the gesture-based command to the application server, the application server executing the gesture-based command within the application.

In some implementations, the method includes receiving a first listening command via the local input device; entering into a monitoring state, by the computing device, responsive to receiving the first listening command; and receiving the audible command, by the computing device, while in the monitoring state. In a further implementation, the method includes receiving a plurality of audible commands while in the monitoring state, by the computing device, without exiting the monitoring state, each of the plurality of audible commands translated and provided to the application server separately.

In some implementations, the method includes translating the audible command via a speech-to-text engine of an operating system of the computing device. In some implementations, the method includes maintaining coordinates of a virtual cursor within the application provided by the application server. In a further implementation, the coordinates of the virtual cursor do not correspond to coordinates of a cursor of the computing device. In another further implementation, the method includes determining a motion vector corresponding to the audible command; and wherein providing the gesture-based command to the application server causes the application server to apply the motion vector to the virtual cursor.

In some implementations, the method includes accessing the application provided by the application server via a session-layer protocol communication; and providing the gesture-based command to the application server includes instantiating a virtual channel within the session-layer protocol communication, the gesture-based command communicated via the virtual channel.

In another aspect, the present application is directed to a system for voice-assisted control of hosted applications. The system includes a computing device comprising a processor, a local input device, and a network interface in communication with an application server providing an application on behalf of a user of the computing device. The network interface is configured to access the application provided by the application server. The processor is configured to: receive, via the local input device, an audible command; and translate the audible command into a gesture-based command. The network interface is further configured to provide the gesture-based command to the application server, the application server executing the gesture-based command within the application.

In some implementations, the processor is further configured to: receive a first listening command via the local input device; enter into a monitoring state, responsive to receiving the first listening command; and receive the audible command while in the monitoring state. In a further implementation, the processor is further configured to receive a plurality of audible commands while in the monitoring state, without exiting the monitoring state, each of the plurality of audible commands translated and provided to the application server separately.

In some implementations, the processor is further configured to translate the audible command via a speech-to-text engine of an operating system of the computing device. In some implementations, the processor is further configured to maintain coordinates of a virtual cursor within the application provided by the application server. In a further implementation, the coordinates of the virtual cursor do not correspond to coordinates of a cursor of the computing device. In another further implementation, the processor is further configured to determine a motion vector corresponding to the audible command; and receipt of the gesture-based command causes the application server to apply the motion vector to the virtual cursor.

In some implementations, the network interface is further configured to access the application via a session-layer protocol communication; and provide the gesture-based command to the application server via a virtual channel within the session-layer protocol communication.

In another aspect, the present disclosure is directed to a method for voice-assisted control of hosted applications. The method includes providing, by an application server to a computing device via a network, access to an application on behalf of a user of the computing device. The method also includes receiving, by the application server, a gesture-based command translated from an audible command by the computing device. The method also includes executing, by the application server, the gesture-based command within the application.

In some implementations, the gesture-based command comprises a motion vector of a virtual cursor within the application; and executing the gesture-based command includes moving the virtual cursor according to the motion vector. In a further implementation, the motion vector is a relative vector lacking absolute coordinates; and the method includes maintaining, by the application server, coordinates of the virtual cursor within the application. In a further implementation, the coordinates of the virtual cursor within the application do not correspond to coordinates of a cursor of the computing device. In some implementations, the method includes providing access via a session-layer protocol communication; and receiving the gesture-based command includes receiving the gesture-based via a virtual channel instantiated within the session-layer protocol communication.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 5A is an illustration of an implementation of an application receiving a gesture via a user input device;

FIG. 5B is an illustration of an implementation of a hosted application receiving a gesture via a user input device;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes systems and methods for voice-based commands.

A. Network and Computing Environment

Figure 1A:
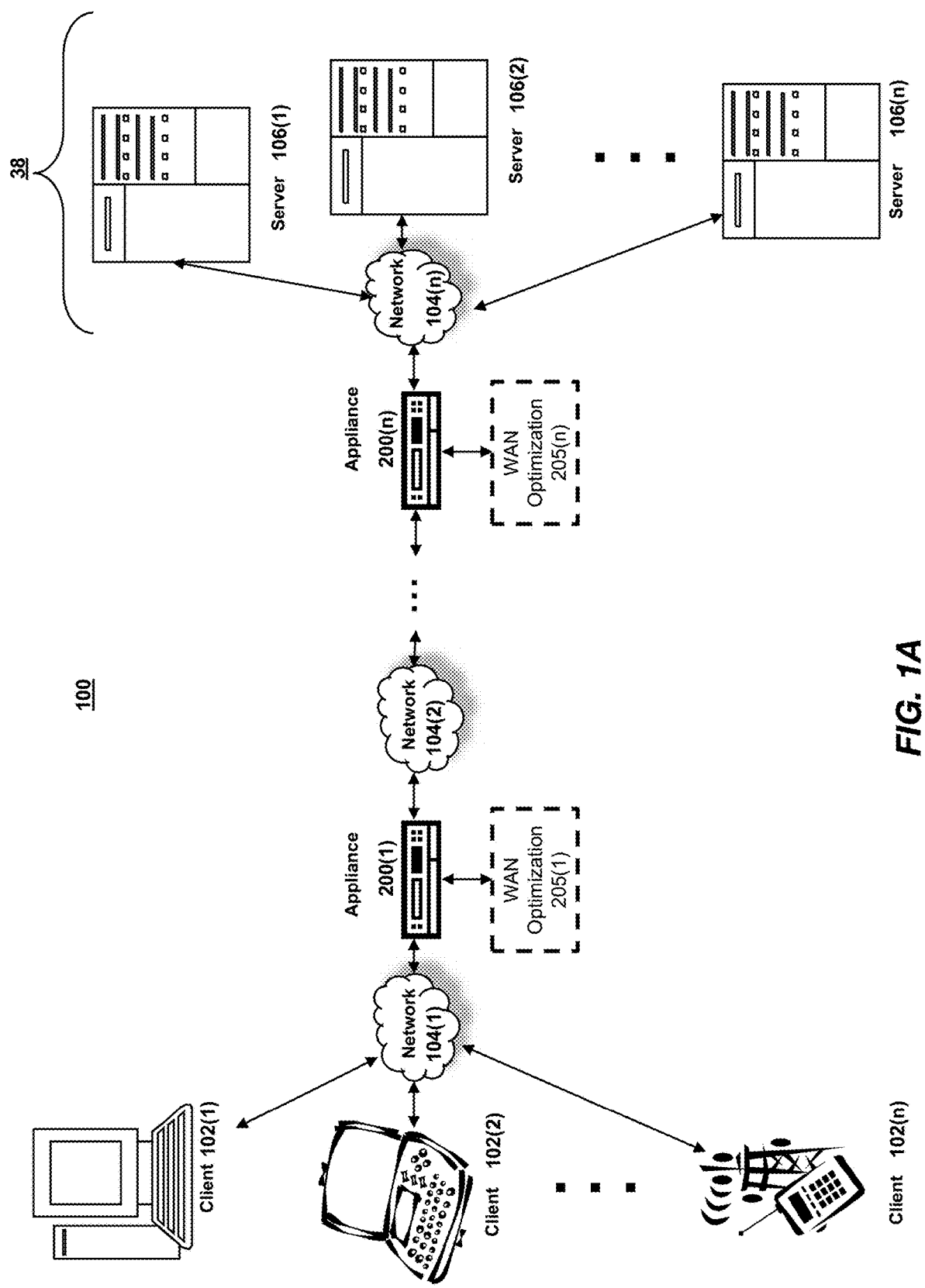
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix Networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
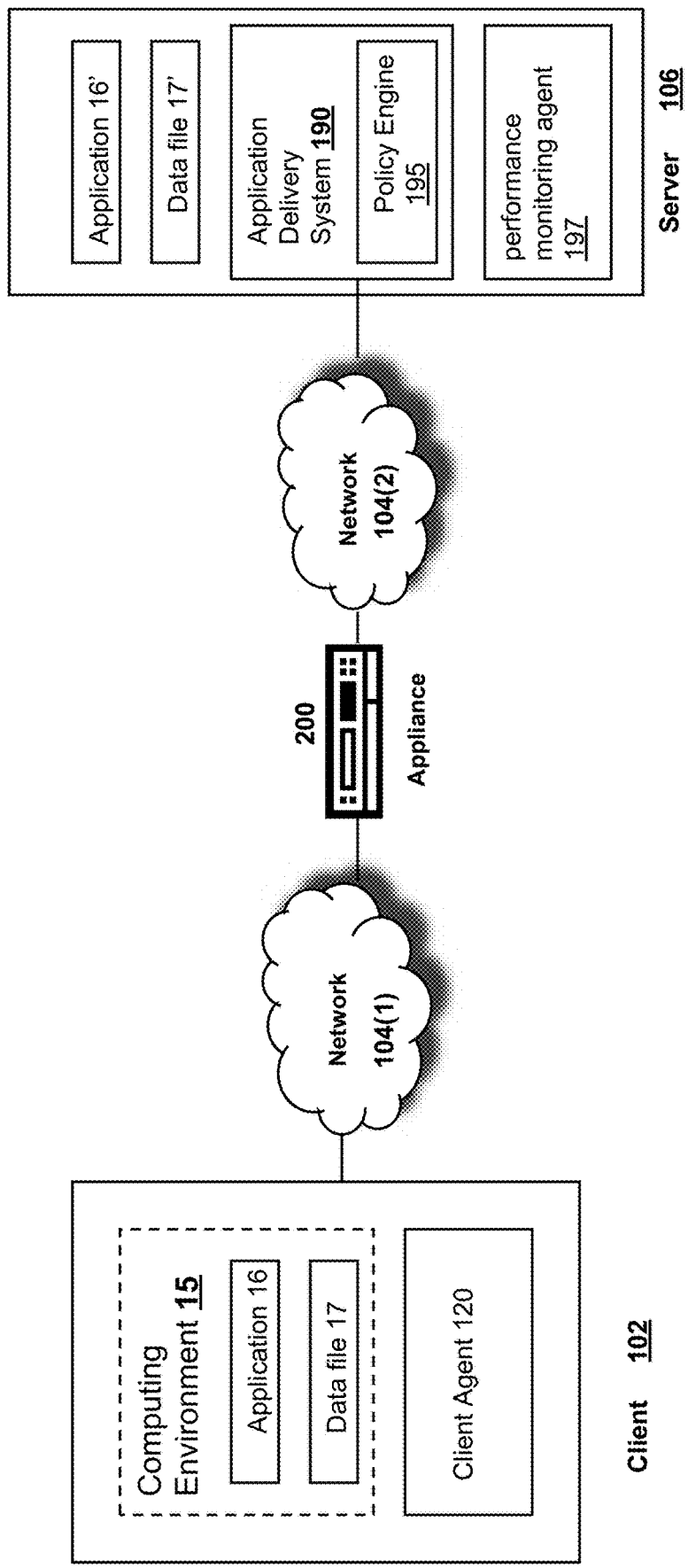
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
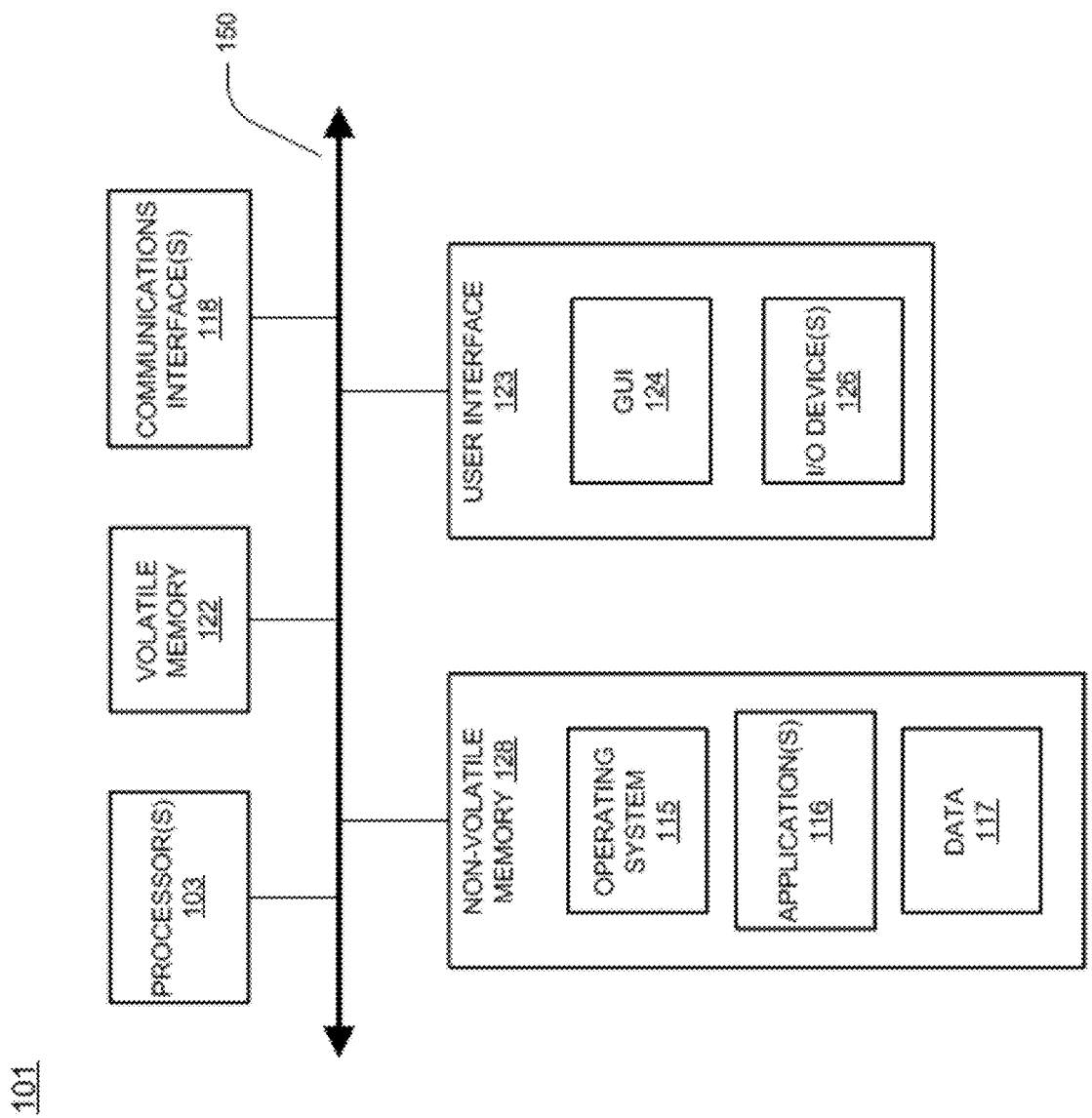
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
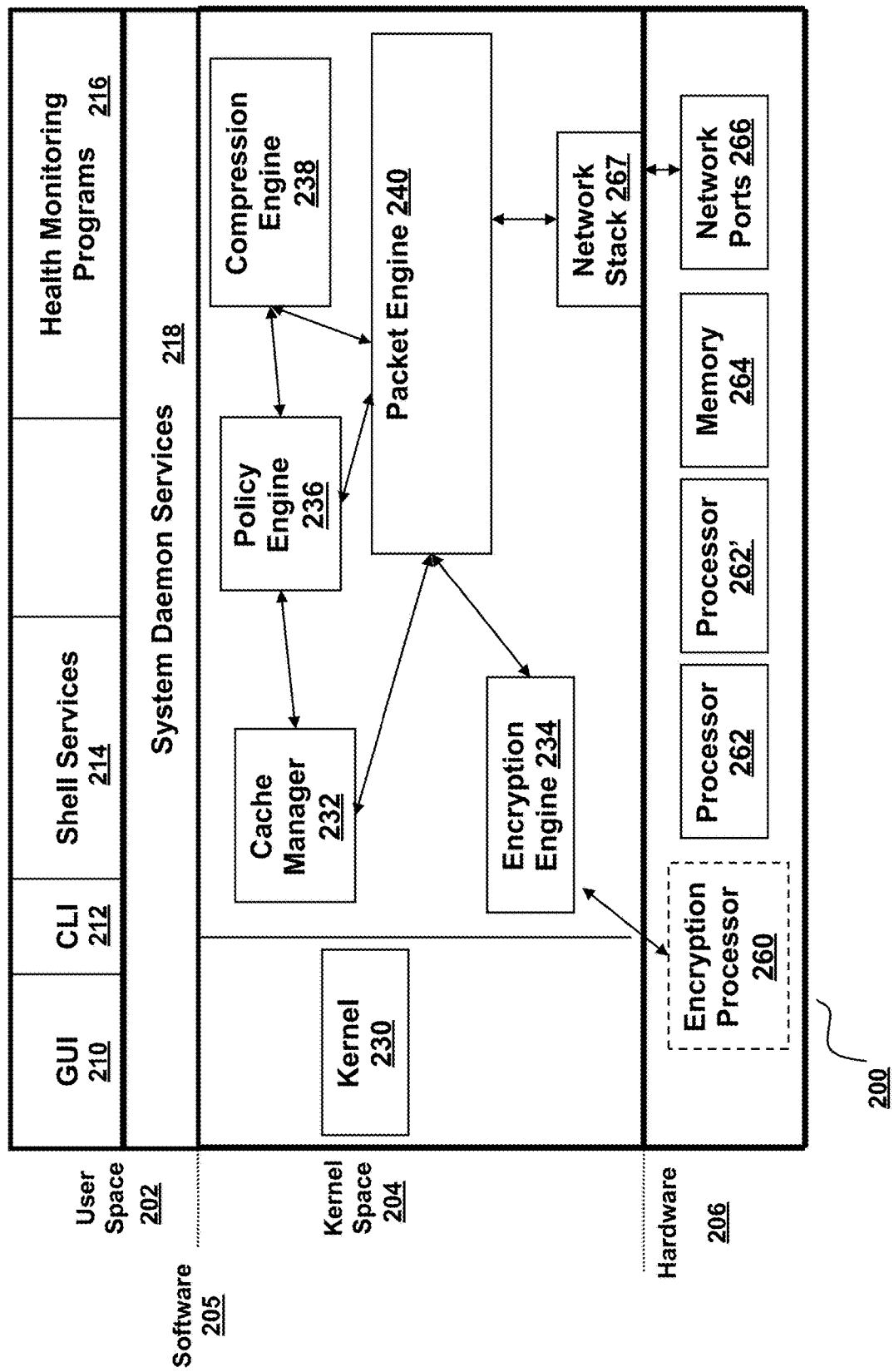
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
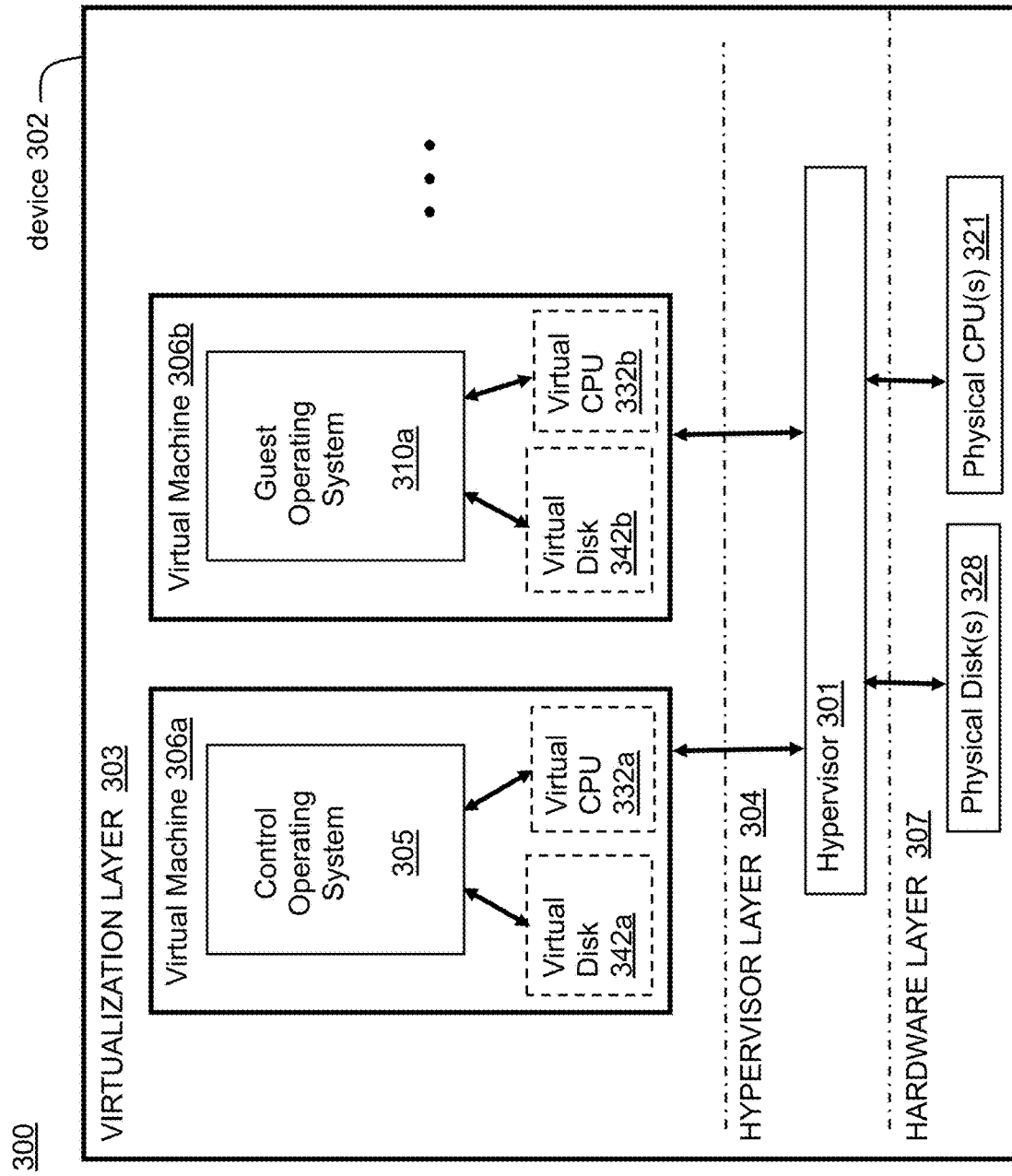
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
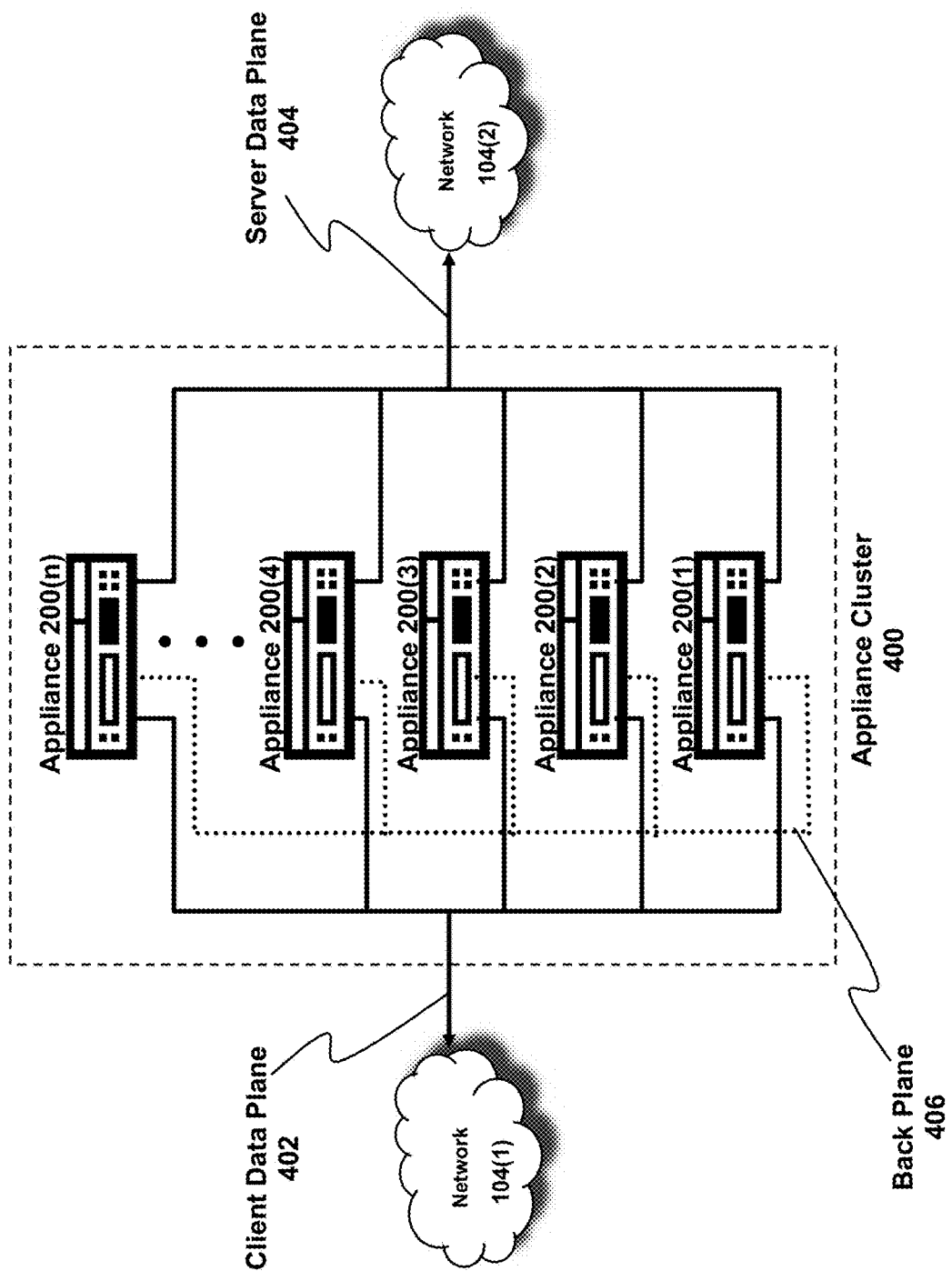
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Voice-Based Commands

In many applications, users may interact with a user interface via gestures performed with a mouse, touchpad, or other input device. For example, swiping gestures may be used for scrolling or panning (with one or more fingers, in various implementations), zooming (e.g. via a pinch operation or mouse wheel), or other such operations. Users may thus scroll through text or images, view subsequent or prior pages, etc.

For example, FIG. 5A is an illustration of an implementation of an application receiving a gesture via a user input device. A client device 500 such as a tablet computing device (illustrated), or a smart phone, wearable computing device, laptop or desktop computing device with a touch screen input device, or any other such device, may execute and display an application 502 on behalf of a user of the device. The user may apply a gesture 504, such as touching the touch screen input device and sliding a finger upwards as illustrated, to scroll the view within the application 502. Although shown as a touch input, in some implementations, a gesture may be provided via a pen interface, a mouse interface, an eye tracking interface, or other such input device.

However, in many instances, users may not wish to use manual gestures to perform these commands. Instead, voice commands may be used in some implementations for simple operations, which may be useful in instances where a user interface is too small (e.g. on a mobile device), where the user's hands may be unavailable (e.g. driving, in hazardous conditions such as labs or shop floors, etc.), where the user may be unable to use manual gestures (e.g. due to a disability, etc.), or in other such conditions.

Some operating systems provide speech-to-text translation via a native agent of the operating system. The operating system may record an input from a microphone (frequently in response to a key press, or responsive to monitoring the input for a predetermined trigger sound or word), and may translate the input into a predetermined command. The command may be applied via an application programming interface (API) of the operating system or an application, such as opening or closing a program or window. However, these agents are frequently unable to perform advanced gesture-based commands.

For example, a user may speak to the device 500 via a microphone of the device and provide an audible command such as "device, close application." An operating system of the device may identify the trigger word (e.g. "device") and record subsequent audible input (e.g. "close application"). The audible input may be translated via a speech-to-text engine into the text command (e.g. "close application"), which may then be compared to predetermined commands of an API. The operating system may then execute the command, e.g. by closing the application. However, the operating system may be unable to interpret non-predetermined commands or gestures, such as an audible command to "swipe up" or "scroll down a little."

Additionally, because these commands are executed or applied by the device operating system via these APIs, the command may not be applied (or may not be correctly applied) to remote applications, such as hosted applications, SaaS applications, applications executing in a remote desktop environment, etc. For example, FIG. 5B is an illustration of an implementation of a hosted application 506 provided by an application server 510 receiving a gesture 504 via an input device of a client device 500. The hosted application 506 may be displayed in or accessed via an application 502', such as a web browser, remote desktop application, or other such remote access application. In order to apply the gesture 504 to the hosted application 506, the command may need to be received and interpreted by a local operating system of the device 500, applied within the presentation application 502', transferred to an operating system 512 of the application server 510, and further applied to the hosted application 506. Systems that are not configured for such implementations may, for example upon receiving a command to "close window", may close the window of the local application 502', rather than a window of the hosted application 506 provided by the application server 510.

Instead, the systems and methods discussed herein allow for capture and translation of these audible commands and application of the corresponding commands to hosted or SaaS applications, allowing more complex interaction than via native operating system speech-to-text engines. In particular, the systems and methods discussed herein allow for use of speech commands as user interface commands within hosted or SaaS applications. A transducer of a device, such as a microphone, may receive an audible or spoken command from a user and may translate the input audio into text via a speech-to-text engine, either as part of the operating system of the device or via a separate agent (which may be executed by the device or a remote server). The text may be interpreted via a natural language parser (either on the device or the remote server) to identify a command, such as scrolling, panning, zooming, or other such gestures. A context may be retrieved, such as coordinates of a cursor or other interface element within a hosted application or SaaS application, and the command may be applied based on the coordinates of the cursor (e.g. as a motion vector for a touch gesture starting from the coordinates). The audible command may include relative parameters, such as a direction or an amount, which may be similarly parsed and applied in combination with the gesture command.

Figure 5C:
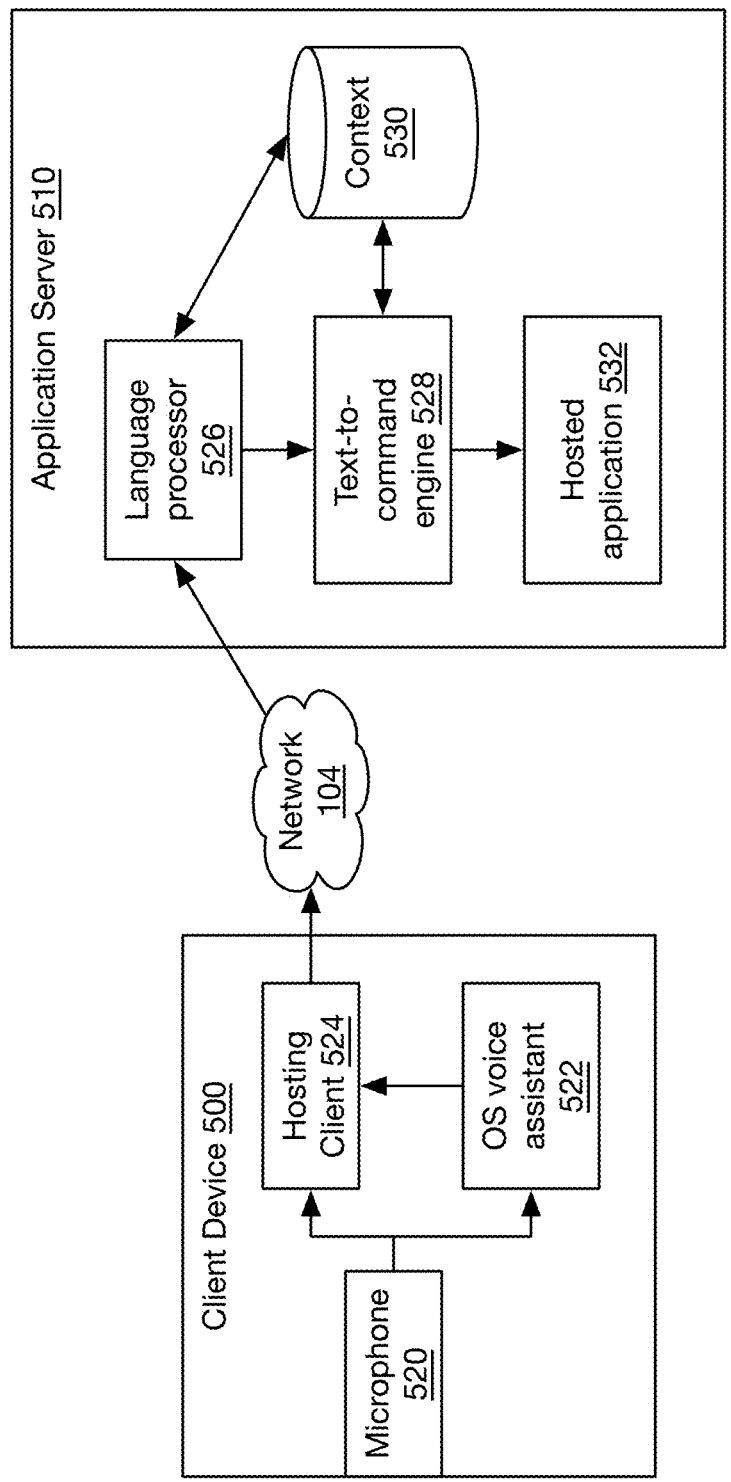
FIG. 5C is a block diagram of an implementation of a system for utilizing voice commands via hosted or remote applications.

FIG. 5C is a block diagram of an implementation of a system for utilizing voice commands via hosted or remote applications including SaaS applications. A client device 500, which may include a laptop computing device, tablet computing device, smart phone, wearable computing device, or any other type and form of computing device, may comprise an input transducer such as a microphone 520 for receiving audible commands (as well as internal components not illustrated for receiving the audio signal, such as amplifiers, filters, analog-to-digital converters, etc.).

The audible command (converted to digital audio in many implementations) may be converted to text via a speech-to-text engine of an operating system voice assistant 522 or a hosting client application 524, in various implementations. For example, in some implementations, the audible command may be converted to text by an operating system native voice assistant. Rather than executing the command, a hosting client application 524, such as a client application 404 comprising an embedded browser 410 as described herein, may intercept or hook the output of the speech-to-text engine via an API without providing the command to the operating system or other applications of the client device, in some implementations. In other implementations, the hosting client application 524 may intercept or receive the digital audio and may convert the audio to text via a speech-to-text engine of the application 524, avoiding the operating system's agent. This may be particular useful in implementations in which the operating system does not provide a speech-to-text engine. In still other implementations, the audio may not be converted at the client device 500; rather, the audio may be transferred to an application server 510 via a network 104 and may converted to text by a speech-to-text engine of the application server 510 (not illustrated).

Either the converted text and/or the audio may be transferred to application server 510 by the hosting client application 524 via a network 104, such as a network 104 as discussed herein. In some implementations, the client application 524 may have established communications with the application server 510, e.g. via a session or presentation layer protocol such as a remote desktop protocol or independent computing architecture (ICA) protocol. In some such implementations, the audio and/or text command may be provided via a virtual channel of the session or presentation layer protocol; the virtual channel may be instantiated or established for each command to be transferred, or may be established for a plurality of commands.

Application server 510 may comprise any type and form of computing device or device(s), including a cloud of virtual computing devices executed by one or more physical computing devices, a server farm, a desktop computing device, a rackmount computing device, an appliance or cluster of appliances, or any other such device as described herein. Application server 510 may include one or more memory devices storing a hosted application 532 for presentation to or access by a hosting client application 524, such as a SaaS application, virtual or remote desktop application, web application, or any other type and form of application. The application 524 may be executed by one or more processors, including virtual processors executed by physical processors.

Once transferred to the application server 510 (and optionally converted from audio to text as discussed above), the text command may be parsed by a language processor 526 of the application server. Language processor 526 may comprise a natural language parser to convert the provided text into commands and parameters for the commands, such as "scroll" and "upwards" or "downwards" and/or "a little" or "a page" or "a lot" or any other such command and parameter or parameters. Multiple parameters may be applied, in some implementations. The parser may convert text into commands via pattern matching or regex, or may use semantic analysis to compare the text to predetermined keywords. For example, text such as "up", "upwards", "north", "earlier", "above", or other similar words may be mapped to a command or parameter indicating a scrolling or panning direction. Use of the language processor may avoid having to explicitly list each possible way of saying any particular parameter or command, and may accordingly reduce the size of a predetermined command or parameter set (while associating the predetermined commands or parameters with semantic groupings). Language processing may also help where the same text may be used in different contexts, such as "close" indicating variously a window or a program. In some implementations, language processor 526 may retain a log of previously received text and may determine commands and parameters in context of prior commands (e.g. received text indicating a parameter such as "a little farther" may be associated with a prior command of "scroll down", avoiding requiring the user to repeat entire commands). The context and/or prior commands may be stored in context database 530 in a memory device of the application server 510 (or in an external or associated memory device, not illustrated).

The identified commands from language processor 526 may applied via a text-to-command engine 528, which may comprise a context-sensitive API for applying commands within a hosted application or SaaS application. Contexts, such as a status or state of the application 532 as well as coordinates of a cursor for the application 532, may be stored in context database 530 as discussed above. Storing the coordinates of a cursor may allow for gesture reproduction within the application as if input via a touch screen interface of client device 500 or other such device. For example, an application 532 may be configured to respond to a swipe command (e.g. swipe right to switch to a subsequent page). The text-to-command engine 528 may maintain the position of a cursor within a window or virtual window of the application, and, upon receipt of a "swipe right" command text from language processor 526, may generate a motion vector for the cursor (e.g. moving from coordinates 100, 250 to coordinates 300, 250; or a relative motion vector such as a direction and amplitude (e.g. 200 pixels at 5 degrees from horizontal) without an origin point), which may be properly interpreted as swiping to the right within the application. The cursor may be a virtual or invisible cursor; that is, the cursor need not explicitly be displayed in some implementations, such as where the application is intended for display on a client device lacking a mouse or joystick driven user interface, such as a tablet computer or wearable computer; or where the maintained virtual cursor may not necessarily have the same coordinate position as a cursor of client device 500. For example, in some implementations in which the application 532 is provided via a remote desktop application 524 of a client device, a user of the client device may move a cursor of the client device outside of a window of the remote desktop application (e.g. by moving a mouse or other input device). Gestures generated by text-to-command engine 528 may use the position of the virtual cursor, which may not match the position of the "real" cursor of the client device 500, in order to generate gestures or other actions within the hosted application (e.g. with motions not exceeding the bounds of the remote desktop application 524 on the client device, in some implementations). Furthermore, maintaining the coordinates of the virtual cursor may allow for commands to be applied with precision, such as "scroll up one inch" by generating a motion vector for the gesture based off the position of the virtual cursor.

Each of the above-mentioned elements or entities is implemented in hardware, or a combination of hardware and software, in one or more embodiments. Each component of the system 1100 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the client applications 404). The hardware includes circuitry such as one or more processors in one or more embodiments.

Figure 6:
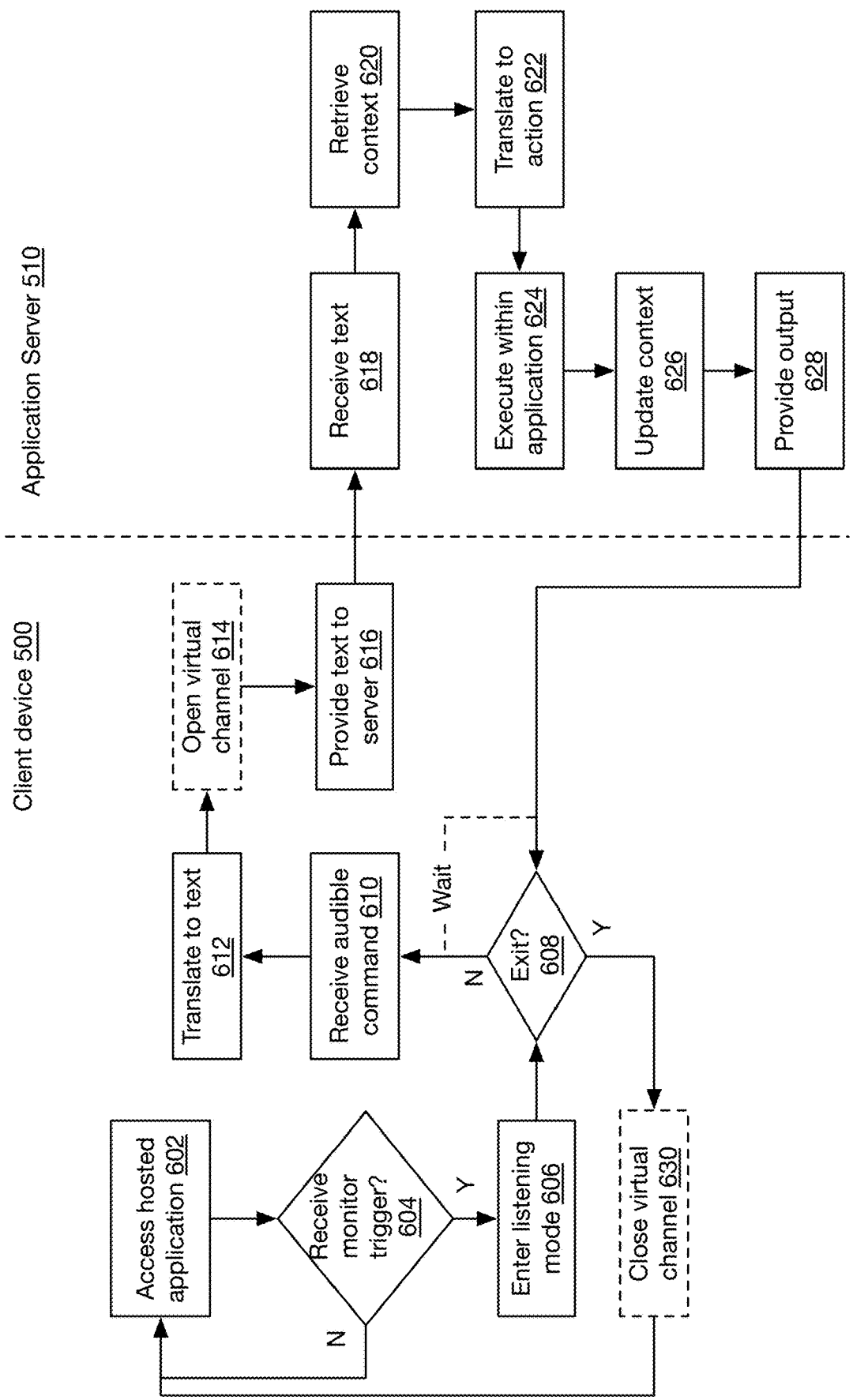
FIG. 6 is a flow chart of an implementation of a method for utilizing voice commands via hosted or remote applications.

FIG. 6 is a flow chart of an implementation of a method for utilizing voice commands via hosted or remote applications. A client device 500 may access a hosted application or SaaS application or other such remote application at step 602 via a network. The application may be provided by an application server on behalf of a user of the client device. In some implementations, the application may be accessed via a session or presentation layer protocol communication, such as a remote desktop or ICA protocol.

At step 604, in some implementations, the client device may monitor a microphone of the device for an input trigger, such as a predetermined word or phrase. The input audio may be matched to a predetermined audio file or pattern to identify whether the input trigger has been received. The pattern or audio file may be trained on a user's voice in some implementations, or may be based on a common pattern.

If no trigger is received, then steps 602-604 may be repeated iteratively. If a trigger is received, then at step 606, the client device may enter a listening or monitoring mode. At step 608, the client device may wait to receive further audible commands. This may continue until a timeout period expires in some implementations. In other implementations, a second audible command may be received to indicate the client device should exit monitoring mode (e.g. "stop listening"). If the monitoring period is exited, the method may resume with step 602 in some implementations.

If an audible command is received at step 610, then at step 612, in some implementations, a speech-to-text engine of the client device (e.g. provided by an operating system or application of the device) may convert the audible command into text. In some other implementations, as discussed above, the audible command may be provided as digital audio to an application server, which may convert the audible command to text (e.g. after step 618). In some implementations, a speech-to-text engine of an application may intercept digital audio before it is provided to a speech-to-text engine of an operating system of the device, to avoid the operating system processing the command.

In some implementations, the client device may open a virtual channel of a session or presentation-layer protocol communication with the application server at step 614. Opening the channel may comprise performing handshaking, establishing configuration parameters, or other such tasks. In some implementations in which a virtual channel has already been established, then step 614 may be skipped. At step 616, the text and/or audio may be provided to an application server 510, in some implementations via the virtual channel.

At step 618, the server may receive the text and/or audio, and in some implementations, may retrieve a context for a command at step 620 (e.g. application state, window title or titles, coordinates of a virtual cursor of the hosted application, etc.). At step 622, the server may translate the received text and/or audio into one or more commands and/or command parameters via a language processor of the application server. Translating the text may comprise identifying keywords in the text semantically related to a set of predetermined commands and/or parameters, such as "scroll" and "up" or "down" or "a little" or other such parameters.

At step 624, the server may execute the command and/or parameters within the hosted application. Executing the command may comprise generating a motion vector for a virtual cursor based on a current position or coordinates of the cursor and the command and parameters, and moving the cursor according to the motion vector as if moved directly by the user. In some implementations, the motion vector may linear (e.g. from a first point to a second point, or from a first point for a distance in a predetermined direction or angle) or may be a complex vector (e.g. a series of vectors, or a complex motion such as a loop, circle, or other motion).

In some implementations, at step 626, the application server may update the stored context for the application (e.g. new position of the virtual cursor, new window title or page of an application, etc.). At step 628, the application server may provide the output of the application to the client device via the communications channel (e.g. rendering a new page of an application, or otherwise providing output of the results of the command on the application).

In some implementations, multiple commands may be provided in sequence with one activation of the monitoring trigger at step 604. In such implementations, steps 608-628 may be repeated iteratively for each new command, until a timeout expires or a stop listening or end monitoring command is received by the client device (e.g. an audible command or trigger, or a physical trigger such as a key press or button click). In some implementations in which input audio may be intercepted and not processed by the client device (e.g. to avoid processing by an operating system agent of the client device), an end monitoring command may not necessarily be processed locally. In some such implementations, the end monitoring command may be provided to the application server as with any other command at step 616-618. The server may identify the end monitoring command and provide the command to a client application of the client device (e.g. via a virtual channel) to direct the client application to stop monitoring commands (or direct an operating system agent to stop recording audible inputs until a subsequent trigger is directed). Once monitoring is ended, in some implementations, a virtual channel of the communication channel between the client device and application server may be closed at step 630 (in other implementations, the virtual channel may be maintained without closing, in preparation for further commands).

Thus, the systems and methods discussed herein allow for capture and translation of voice commands into user interface commands and gestures, allowing more complex interaction than via native operating system speech-to-text engines. In particular, the systems and methods discussed herein allow for use of speech commands as user interface commands within hosted or SaaS applications.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for voice-assisted control of hosted applications, comprising:

accessing, by a computing device via a network, an application provided by an application server on behalf of a user of the computing device;

receiving, by the computing device via a local input device, an audible command;

translating, by the computing device, the audible command into a gesture-based command, the gesture-based command comprising a relative motion vector lacking absolute coordinates for a virtual cursor within the application, coordinates of the virtual cursor maintained by the application server or the computing device; and providing, by the computing device via the network, the gesture-based command to the application server for execution within the application by moving the virtual cursor according to the relative motion vector.

2. The method of claim 1, wherein receiving the audible command further comprises:

receiving a first listening command via the local input device;

entering into a monitoring state, by the computing device, responsive to receiving the first listening command; and receiving the audible command, by the computing device, while in the monitoring state.

3. The method of claim 2, further comprising receiving a plurality of audible commands while in the monitoring state, by the computing device, without exiting the monitoring state, each of the plurality of audible commands translated and provided to the application server separately.

4. The method of claim 1, wherein translating the audible command into the gesture-based command further comprises translating the audible command via a speech-to-text engine of an operating system of the computing device.

5. The method of claim 1, wherein the coordinates of the virtual cursor do not correspond to coordinates of a cursor of the computing device.

6. The method of claim 1, wherein accessing the application provided by the application server further comprises accessing the application via a session-layer protocol communication; and wherein providing the gesture-based command to the application server further comprises instantiating a virtual channel within the session-layer protocol communication, the gesture-based command communicated via the virtual channel.

7. A system for voice-assisted control of hosted applications, comprising:
a computing device comprising a processor, a local input device, and a network interface in communication with an application server providing an application on behalf of a user of the computing device;
wherein the network interface is configured to access the application provided by the application server;
wherein the processor is configured to:
receive, via the local input device, an audible command, and
translate the audible command into a gesture-based command comprising a relative motion vector lacking absolute coordinates for a virtual cursor within the application, a position of the virtual cursor maintained by the processor or the application server; and
wherein the network interface is further configured to provide the gesture-based command to the application server for execution within the application by moving the virtual cursor according to the relative motion vector.

8. The system of claim 7, wherein the processor is further configured to:
receive a first listening command via the local input device;
enter into a monitoring state, responsive to receiving the first listening command; and
receive the audible command while in the monitoring state.

9. The system of claim 8, wherein the processor is further configured to receive a plurality of audible commands while in the monitoring state, without exiting the monitoring state, each of the plurality of audible commands translated and provided to the application server separately.

10. The system of claim 7, wherein the processor is further configured to translate the audible command via a speech-to-text engine of an operating system of the computing device.

11. The system of claim 7, wherein the coordinates of the virtual cursor do not correspond to coordinates of a cursor of the computing device.

12. A method for voice-assisted control of hosted applications, comprising:
providing, by an application server to a computing device via a network, access to an application on behalf of a user of the computing device;
receiving, by the application server, a gesture-based command translated from an audible command by the computing device, the gesture-based command comprising a relative motion vector lacking absolute coordinates for a virtual cursor within the application, coordinates of the virtual cursor maintained by the application server or the computing device; and
executing, by the application server, the gesture-based command within the application by moving the virtual cursor according to the relative motion vector.

13. The method of claim 12, wherein the coordinates of the virtual cursor within the application do not correspond to coordinates of a cursor of the computing device.

14. The method of claim 12, wherein providing access to the application further comprises providing access via a session-layer protocol communication; and wherein receiving the gesture-based command further comprises receiving the gesture-based command via a virtual channel instantiated within the session-layer protocol communication.

15. The system of claim 7, wherein the network interface is further configured to access the application via a session-layer protocol communication; and provide the gesture-based command to the application server via a virtual channel within the session-layer protocol communication.

* * * * *